United States Patent

Jansen et al.

Patent Number: 5,591,386
Date of Patent: Jan. 7, 1997

[54] VEHICLE WHEEL WITH FILLER RING

[75] Inventors: Daniel F. Jansen, Saline; Thomas E. Heck, Monroe; Charles A. Turner, Pinckney, all of Mich.

[73] Assignee: Hayes Wheels International, Inc., Romulus, Mich.

[21] Appl. No.: 214,923

[22] Filed: Mar. 17, 1994

[51] Int. Cl.⁶ ............................................. B60B 3/00
[52] U.S. Cl. ................... 264/46.9; 264/46.6; 301/63.1; 152/DIG. 20
[58] Field of Search .................. 301/37.1, 37.24, 301/37.43, 63.1, 64.2, 95, 96, 97, 98; 152/DIG. 20; 264/46.4, 46.5, 46.6, 46.9, 55

[56] References Cited

U.S. PATENT DOCUMENTS 4,623,009  11/1986  Seitz et al. .................... 152/DIG. 20
4,898,630   2/1990  Kitoh et al. ....................... 263/55 X

FOREIGN PATENT DOCUMENTS 3503882  8/1986  Germany ........................ 301/63.1
3632063  3/1988  Germany ........................ 301/63.1
91/7289  5/1991  WIPO ........................... 301/37.43

Primary Examiner—Russell D. Stormer
Attorney, Agent, or Firm—MacMillan, Sobanski & Todd

[57] ABSTRACT

An improved wheel construction includes a disc and a rim secured together and which define a radially inwardly facing circumferential cavity in the wheel. In accordance with the present invention, a filler material is disposed in a substantial portion of the cavity to prevent road material or other debris from accumulating in the cavity and causing an out-of-balance wheel condition.

5 Claims, 2 Drawing Sheets

VEHICLE WHEEL WITH FILLER RING

BACKGROUND OF THE INVENTION

This invention relates to an improved vehicle wheel construction.

Vehicle wheels, such as for automotive and truck applications, can be produced by using a variety of materials and construction techniques. For example, to produce a conventional fabricated wheel, a rolled full rim (which defines both an inboard and an outboard retaining flange for an associated tire), is welded to a center disc. Depending upon the particular design, the disc can be welded to the rim at various points, including, for example, the area adjacent the outboard tire bead seat. In producing a "full face" type wheel, a "partial" rolled rim is welded to a full center disc whose outer edge forms at least a portion of the outboard tire bead seat retaining flange. The full center disc can be stamped, cast or forged. Other construction techniques include one-piece casting or forging.

In most vehicle wheel constructions, a radially inwardly facing circumferential cavity or pocket is formed in the wheel in an area adjacent the outboard tire bead seat. For example, in both the "bead seat" attached and "full face" construction the disc and the rim cooperate to define such a cavity.

SUMMARY OF THE INVENTION

In those constructions which include a circumferential cavity as described above, during vehicle operation, road material or other debris, such as for example snow, gravel, salt, or mud, can enter through windows or openings which are provided in the disc or through an open inboard side of the wheel and accumulate in the cavity. Also, if water is present in the cavity, the water can settle and freeze in a lower portion of the wheel cavity when the vehicle is parked for sufficient time in freezing temperatures. This accumulated material may result in a significant out-of-balance wheel condition. This invention concerns an improved wheel construction which prevents material from accumulating in the circumferential cavity of the wheel and causing an out-of-balance wheel condition.

In particular, the improved wheel construction includes a disc and a rim secured together and which define a radially inwardly facing circumferential cavity in the wheel. In accordance with the present invention, a lightweight (preferably foamed) filler material is disposed in a substantial portion of the cavity to prevent road material or other debris from accumulating in the cavity and affecting wheel balance.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1A:
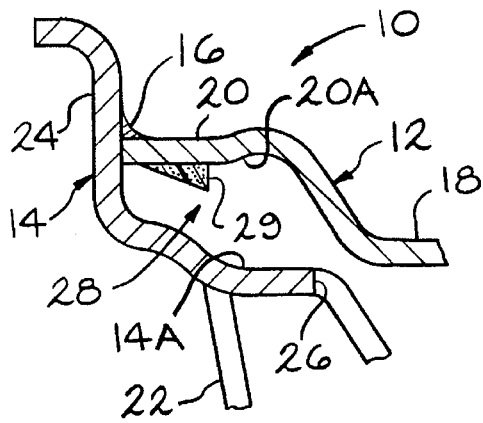
FIG. 1A is a partial cross-sectional view of an extruded filler material for use in a full face type wheel constructed in accordance with the present invention.

Referring now to the drawings, there is illustrated in FIG. 1A a partial cross-sectional view of an improved full face type wheel, indicated generally at 10, and constructed in accordance with the present invention. The wheel 10 can be of the type disclosed in U.S. Pat. No. 5,188,429 to Heck et al., and herein incorporated by reference.

The wheel 10 includes a rim 12 and a disc 14 which are secured together by a weld 16. The rim 12 is a formed rim constructed from steel, aluminum or other alloys, and includes an inboard tire bead seat retaining flange (not shown), an inboard tire bead seat (not shown), a generally axially extending well 18 (partially shown), and an outboard tire bead seat 20. The disc 14 is a forged, cast, or formed disc constructed from steel, aluminum or other alloys, and includes a centrally locating mounting surface 22 (partially shown), and an outer annular portion 24.

As shown in this embodiment of the wheel 10, a plurality of windows or openings 26 are formed in the disc 14 (only one window 26 is partially shown). When the rim 12 and disc 14 are assembled, a radially inwardly facing circumferential cavity or pocket 28 is formed between an inner surface 20A of the outboard tire bead seat 20 of the rim 12 and an inner surface 14A of the disc 14. The construction of the wheel 10 thus far described is conventional in the art.

Figure 1B:
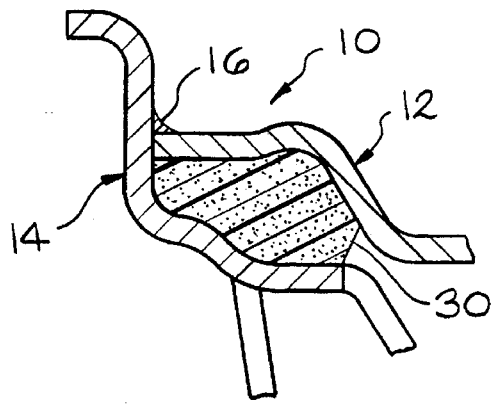
FIG. 1B is a view similar to FIG. 1A and showing the filler material in its expanded state.

Referring to FIGS. 1A and 1B, the present invention provides, in one embodiment, an extruded filler material 29 located on the inner surface 20A of the outboard tire bead seat 20 of the rim 12. The filler material 29 is an expandable foam material, such as for example, a 4G300D expandable foam material manufactured by L & L Products, Inc. of Romeo, Mich. Preferably, the foam material 29 is heat activated, and the volumetric expansion of the material can be varied between approximately 300%–1000% of its original volume. Also, the shape of the filler material 29 is predetermined depending upon the particular wheel construction (i.e., the shape of the cavity 28) and final shape after expanding which is desired. As shown in the embodiment of FIG. 1A, the filler material 29 is generally triangular in cross-section.

Preferably, the foam material 29 is applied to the inner surface 20A of the rim 12 prior to the assembling of the wheel 10. This enables the foam material to be accurately extruded on the inner surface 20A of the outboard tire bead seat 20 of the rim 12. Also, if heat activated foam is used, the foam material can be expanded during the curing of the wheel primer to produce the shape shown in FIG. 1B. Thus, once the foam material is applied to the rim, no additional manufacturing steps are involved in activating the material to produce the improved vehicle wheel 10 of the present invention.

Figure 2A:
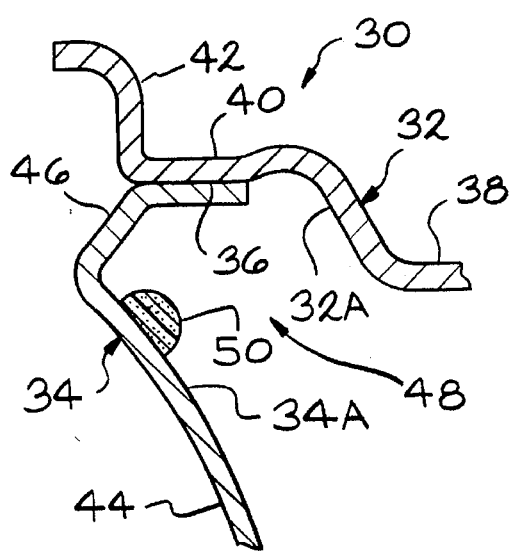
FIG. 2A is a view similar to FIG. 1A and showing an extruded filler material for use in a bead seat attached type wheel.
Figure 2B:
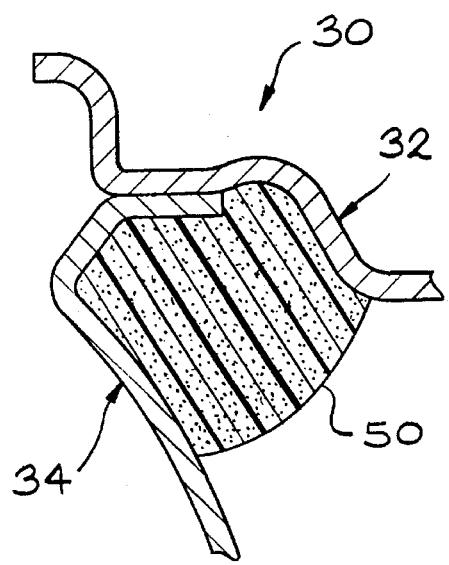
FIG. 2B is a view similar to FIG. 2A and showing the filler material in its expanded state.

Turning now to FIGS. 2A and 2B, there is illustrated an improved bead seat attached type vehicle wheel, indicated generally at 30, which incorporates the present invention. The wheel 30 can be of the type disclosed in the Heck et al. patent.

The wheel 30 includes a rim 32 and a disc 34 which are secured together by a weld 36. The rim 32 is a formed rim constructed from steel, aluminum or other alloys, and includes an inboard tire bead seat retaining flange (not shown), an inboard tire bead seat (not shown), a generally axially extending well 38 (partially shown), an outboard tire bead seat 40, and an outboard tire bead seat retaining flange 42.

The disc 34 is a forged, cast or formed disc constructed from steel, aluminum or other alloys, and includes a centrally locating mounting surface 44 (partially shown), and an outer annular portion 46. As shown in this embodiment of a fabricated wheel 30, the disc 34 does not include windows formed therein.

When the rim 32 and disc 34 are secured together, a radially inwardly facing circumferential cavity 48 is formed between an inner surface 32A of the rim 32 and an inner surface 34A of the disc 34. The construction of the conventional fabricated wheel 30 thus far described is conventional in the art.

In accordance with the present invention, the wheel 30 includes an extruded filler material 50 located on the inner surface 32A of the rim 32. The shape of the filler material 50 is predetermined depending upon the particular wheel construction (i.e., shape of the cavity 48) and final shape desired after expanding. As shown in the embodiment of FIG. 2A, the filler material 50 has a generally semi-circular cross-sectional shape.

The filler material 50 can be the same expandable foam material as described above in connection with FIGS. 1A and 1B, and as shown in this embodiment, is preferably applied to the inner surface 34A of the disc 34 prior to assembling of the wheel 30. This enables the foam to be accurately extruded on the inner surface 34A of the disc 34 prior to assembly of the wheel. Also, the foam material 50 is preferably heat activated to enable the foam to be expanded during the curing of the wheel primer to produce the shape shown in FIG. 2B. Thus, no additional manufacturing steps are involved in activating the material to produce the improved vehicle wheel 30 of the present invention.

Figure 3A:
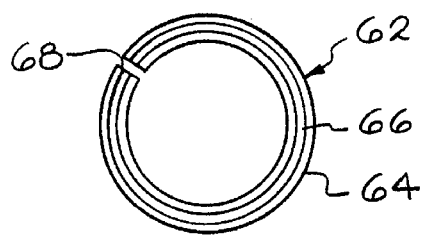
FIG. 3A is a plan view of a ring-like filler member for use in a fabricated wheel.
Figure 3B:
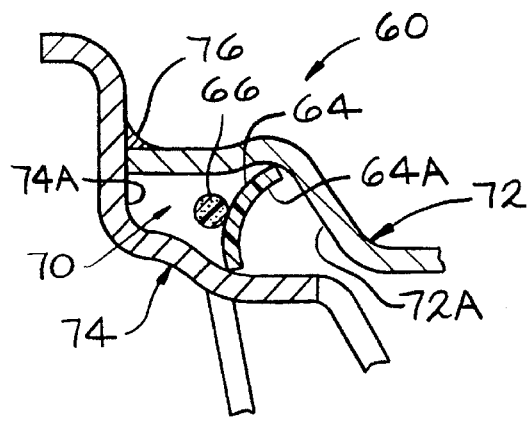
FIG. 3B is a partial cross-sectional view of a fabricated wheel and showing the ring-like filler member in its initial state.
Figure 3C:
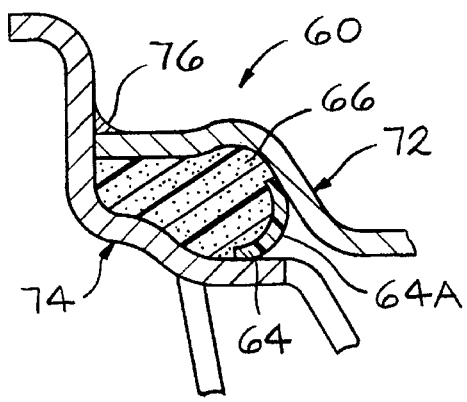
FIG. 3C is a view similar to FIG. 3B and showing the ring-like filler member in its expanded state.

FIGS. 3A, 3B, and 3C illustrate the use of a compound filler member 62 having an expandable foam material applied thereon for filling the annular cavity of a full face type wheel 60. As shown in FIG. 3A, the compound filler member 62 includes a flexible, flat plastic or nylon ring-like member 64 having an expandable foam material 66 applied to one side thereof.

Preferably, for assembly purposes, the ring 64 is slit at 68 so as not to interfere with a valve stem (not shown) of the wheel 60. The ring 64 is preferably formed from a plastic or nylon material so that it will not be affected by the weather. However, other materials, such as for example steel, aluminum, or fabrics can be used. Also, as will be discussed below, the ring 64 is flexible yet rigid in order to allow it to be installed in the cavity and then to remain in place until the foam material is expanded. The particular shape of the foam material applied to the member 64 is predetermined depending upon the wheel construction (i.e., shape of the annular cavity) and final shape desired after expanding. As shown in the embodiment of FIG. 3B, the foam material has a generally circular cross-sectional shape.

Using the filler member 62 requires that the wheel 60 first be assembled by joining a rim 72 to a disc 74 by a weld 76. Once the wheel 60 is assembled, the member 62 is inserted in a radially inwardly facing circumferential cavity 70 of the wheel. As the member 62 is inserted, the sides of the ring 64 frictionally engage the inner surfaces 74A and 72A of the disc 74 and rim 72, respectively, causing the ring 64 to deform and bow slightly to the shape shown in FIG. 3B. The filler member 62 is further inserted into the cavity 70 until it reaches a desired position.

Since the sides of the ring 64 frictionally engage the surfaces 72A and 74A of the rim 72 and disc 74, respectively, the member 62 is held in place until the wheel is primed and cured causing the foam material to expand to the state shown in FIG. 3C. During the expansion of the foam material, the ring 64 may be bowed outwardly to the position shown in FIG. 3C. Once the foam material is expanded, the ring 64 is securely fastened in place and the outer surface of the ring provides a cosmetically acceptable surface. Also, since an outer surface 64A of the ring 64 may be visible in wheels having windows, the color of the ring 64 can be selected to match or contrast the color of the wheel.

Figure 4A:
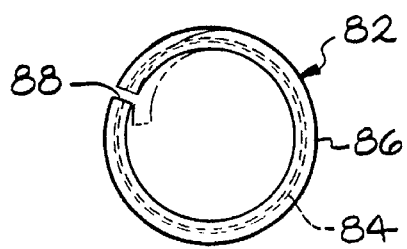
FIG. 4A is a plan view of a wire core filler material for use in a fabricated wheel.
Figure 4B:
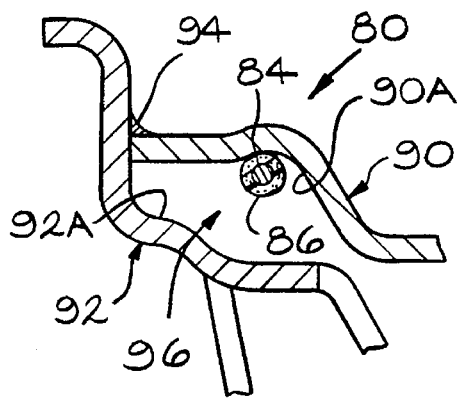
FIG. 4B is a partial cross-sectional view of a fabricated wheel and showing the wire core filler material in its initial state.
Figure 4C:
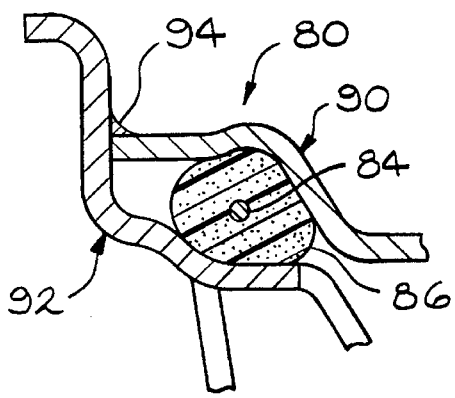
FIG. 4C is a view similar to FIG. 4B and showing the wire core filler material in its expanded state.

Turning now to FIGS. 4A, 4B, and 4C, the present invention is achieved by using a wire core filler member 82 having an expandable foam material applied thereon for filling the annular cavity of a full face type wheel 80. As shown in FIG. 4A, the wire core filler member 82 includes a flexible, round wire core member 84 which is coated with an expandable foam material 86. Preferably, the core member 84 is slit at 88 so as not to interfere with a valve stem (not shown) of the wheel. Also, since the core member is not directly exposed to the weather, it can be constructed from other materials so long as it is flexible in order to allow it to be installed in the cavity and then to remain in place until the foam material is expanded.

Preferably, when using the filler member 82, the wheel 80 in first assembled by joining a rim 90 to a disc 92 by a weld 94. As shown in this embodiment, once the wheel 80 is assembled, the member 82 is elastically deformed (as shown in phantom in FIG. 4A), and inserted in a radially inwardly facing circumferential cavity 96 of the wheel. Once inserted and released, the member 82 will spring back and be positioned in the cavity 96 as shown in FIG. 4B. The wheel 80 can then be primed and cured.

During curing, the foam material will expand in the cavity to the shape shown in FIG. 4C. Also, the particular shape of the foam material applied to the core member 84 is predetermined depending upon the wheel construction (i.e., shape of the cavity 96) and final shape desired after expanding. As shown in the embodiment of FIG. 4B, the foam material has a generally circular cross-sectional shape. In addition, while the filler member 82 is shown as being positioned against an inner surface 90A of the rim 90, the filler member 82 can be sized so as to be positioned against an inner surface 92A of the disc 92.

In accordance with the various embodiments of the present invention, the expanded foam material is operative to fill substantially the entire internal cavity of the associated wheel and prevent debris from entering and lodging therein. As a result of this, an out-of-balance condition cannot be created by debris entering the wheel through the windows of the disc or through the back side of the wheel.

It will be appreciated that while the invention has been described and illustrated as using the filler material for the particular wheel constructions shown in the drawings, the filler material can be used with any wheel construction wherein an internal radially inwardly facing circumferential cavity is formed in the wheel. For example, the filler material can be used in a cast aluminum wheel construction such as shown in U.S. Pat. No. 5,078,453 to Siwek, in a "well attached" wheel construction such as shown in the above-discussed Heck et al. patent, or in a wheel construction comprised of a partial rim and a full face wheel disc such as shown in U.S. Pat. No. 5,027,508 to Cissell II.

In accordance with the provisions of the patent statutes, the principle and mode of operation of this invention have been described and illustrated in its preferred embodiment. However, it must be understood that the invention may be practiced otherwise than as specifically explained and illustrated without departing from the spirit or scope of the attached claims.

What is claimed:

1. A method for producing a vehicle wheel comprising the steps of:
   (a) providing a rim and a disc;
   (b) securing the rim and the disc together to produce a wheel construction which defines a radially inwardly facing circumferential cavity;
   (c) extruding a circumferential bead of a heat activated expandable filler material onto an annular surface of a generally hoop-like member and positioning the hoop-like member in the cavity;
   (d) subsequent to step (c), applying heat to expand the filler material and fill a substantial portion of the cavity to prevent road material or other debris from accumulating therein.

2. The method according to claim 1 wherein the disc and rim include a primer and step (d) includes applying heat to cure the rim and disc primer and to simultaneously expand the filler material.

3. A method for producing a vehicle wheel comprising the steps of:
   (a) providing a rim and a disc;
   (b) securing the rim and the disc together to produce a wheel construction which defines a radially inwardly facing circumferential cavity;
   (c) providing a generally hoop-like member;
   (d) extruding a circumferential bead of an expandable filler material onto an annular surface of the hoop-like member;
   (e) frictionally retaining the hoop-like member in the cavity; and
   (f) expanding the filler material to fill a substantial portion of the cavity and prevent road material or other debris from accumulating therein.

4. The method according to claim 3 wherein the expandable filler material in step (d) is a heat activated filler material, and step (f) includes applying heat to expand the filler material.

5. The method according to claim 3 wherein the disc and rim include a primer and the expandable filler material in step (d) is a heat activated filler material, and step (f) includes applying heat to cure the rim and disc primer and to simultaneously expand the filler material.

\* \* \* \* \*